UNITED STATES PATENT OFFICE.

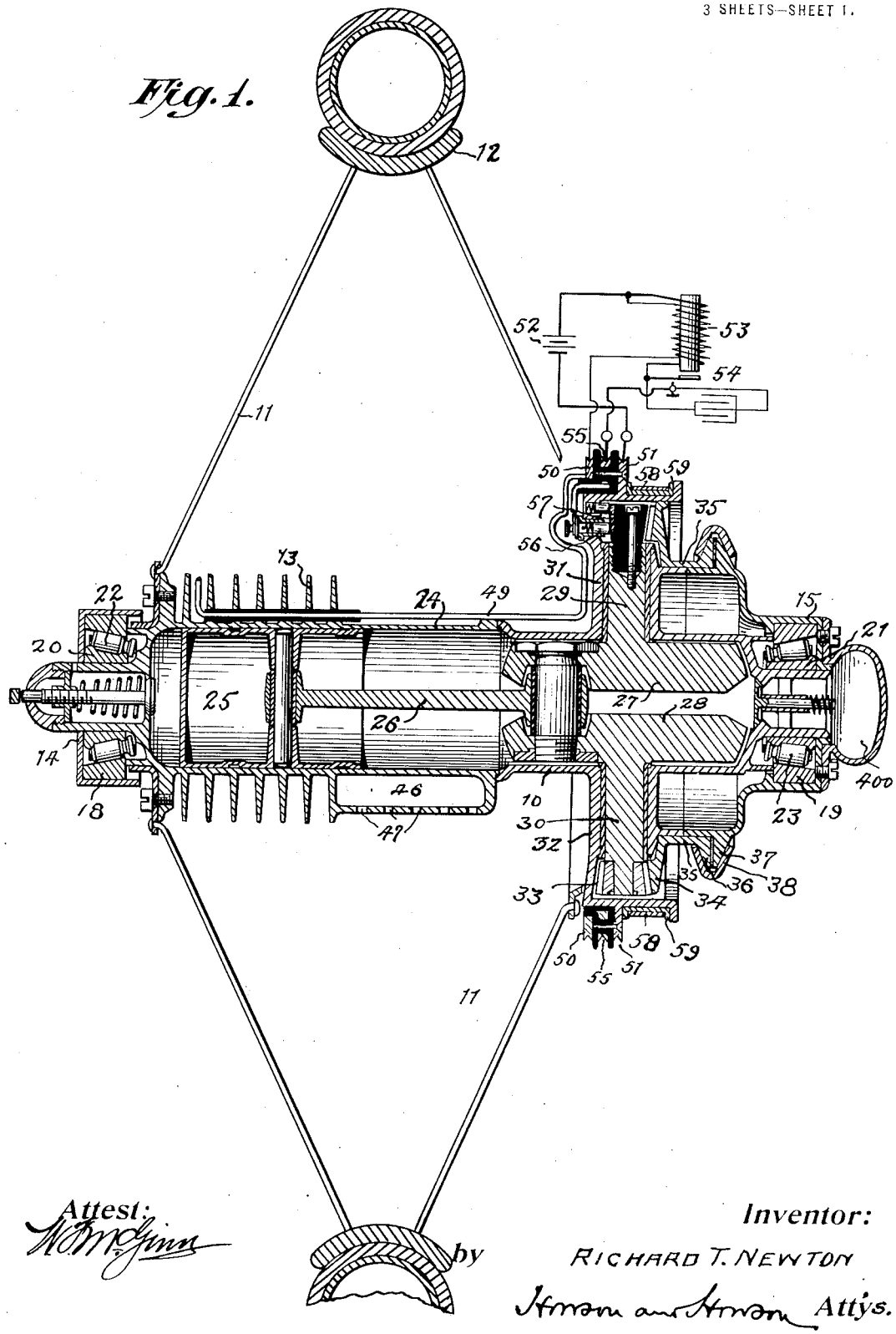

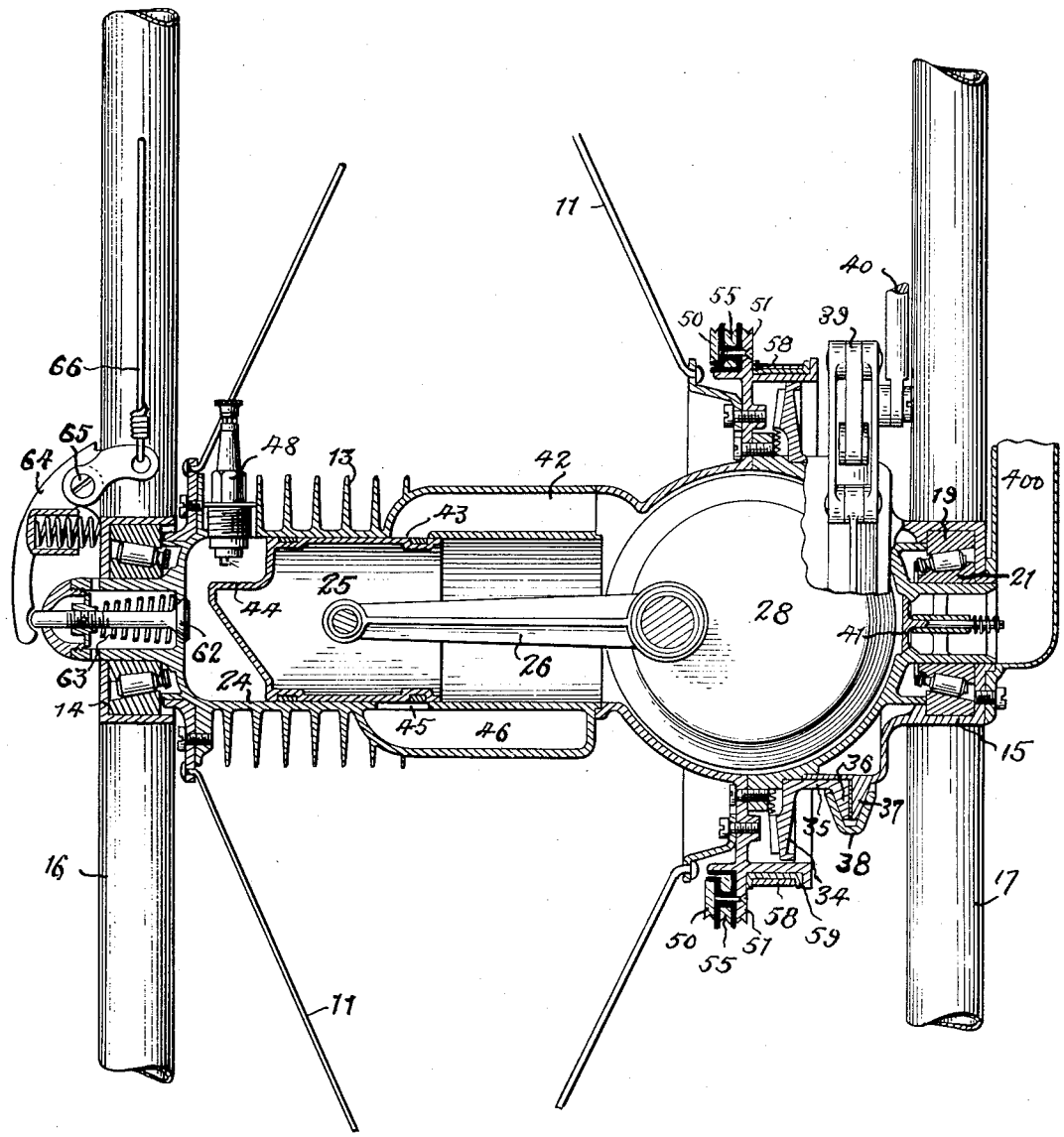

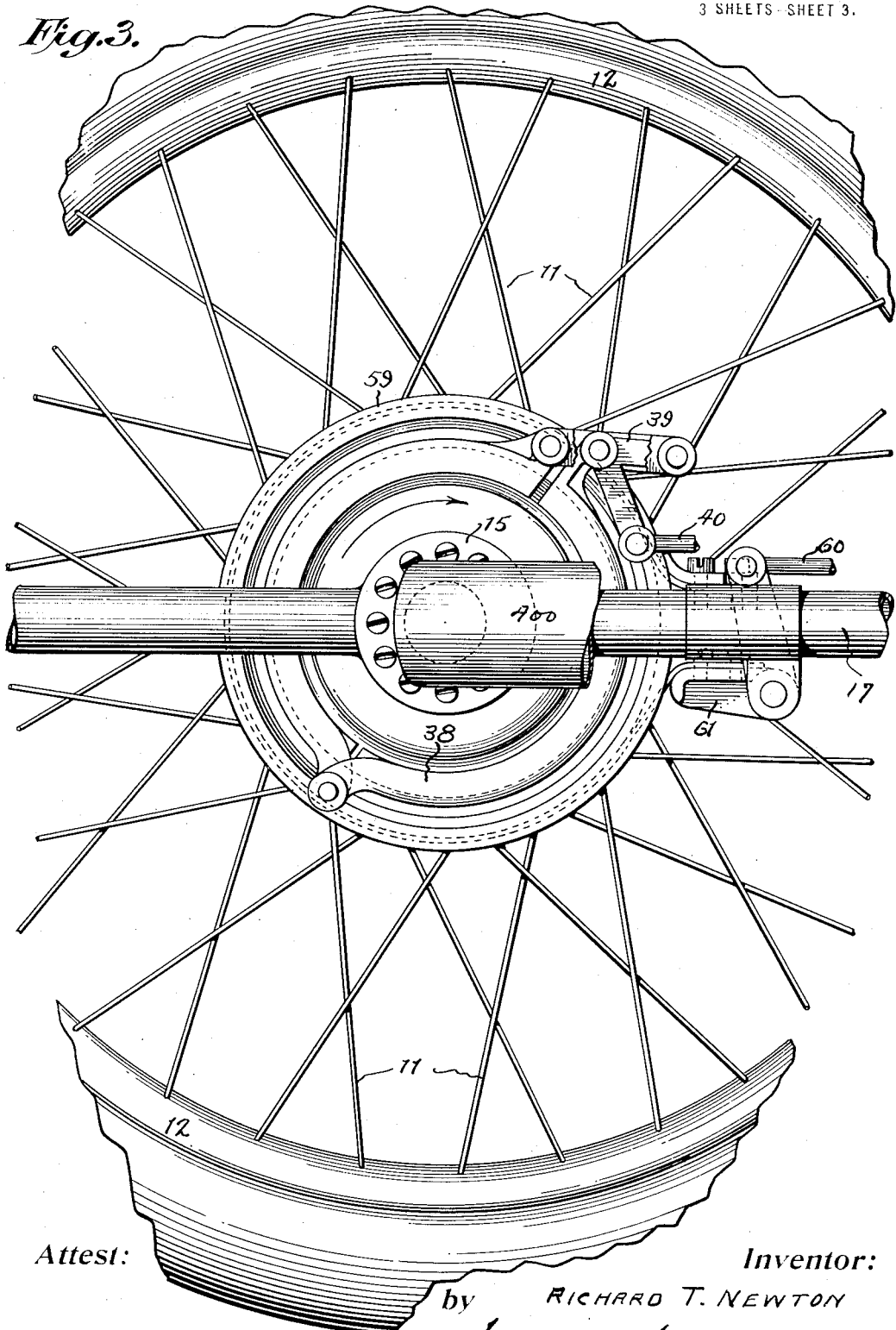

RICHARD T. NEWTON, OF NEW YORK, N. Y.

MOTOR WHEEL.

1,408,385. Specification of Letters Patent. Patented Feb. 28, 1922.

Application filed February 24, 1917. Serial No. 150,748.

*To all whom it may concern:*

Be it known that I, RICHARD T. NEWTON, a citizen of the United States of America, and residing in the city, county, and State of New York, have invented a certain new and Improved Motor Wheel, of which the following is a specification.

My invention relates to motor wheels and particularly to wheels of the type commonly used on motor-cycles, and the object of my invention is to provide a compact rotary engine structurally associated with the motor wheel to drive the latter.

In the accompanying drawings.

Fig. 1 is a partial vertical section through a motor wheel in which my invention is embodied in one form;

Fig. 2 is a section at right angles thereto; and

Fig. 3 is a partial side elevation of the wheel.

As here shown, the present motor wheel comprises an engine casing 10 extending from side to side of the wheel and forming in effect the hub thereof, to which the wheel spokes 11, leading to the rim 12, are attached. Radiating fins 13 may be provided to cool the explosion cylinder. Caps 14 and 15 at opposite ends of the engine casing are made fast to the side supporting frames 16 and 17 of the vehicle and carry bearing rings 18 and 19 between which and cooperating bearing rings 20 and 21 on the engine casing, rollers 22 and 23 are interposed.

The engine casing comprises explosion cylinder 24 with usual piston 25, and connecting rod 26. The latter is jointed at its working end to spaced crank discs 27 and 28, between which the end of the rod works, while their spindles 29 and 30 are journalled in radial arms 31 and 32 on the crank casing. The spindle 30 has at its outer end a beveled gear 33 meshing with a bevel gear ring 34 on an annulus 35 mounted in part on the engine crank shaft casing and in part in the cap 15. At the other end of the annulus, is an outwardly extending beveled flange 36 which corresponds is shape to a like beveled flange 37 formed at the inner end of the cap 15. Surrounding these flanges is a V-shaped clutch strap 38, operated by a toggle lever system 39 and connecting rod 40 which may be led to the handle bars of the motor cycle.

It is obivious that when the clutch band 38 is loose the annulus 35 will be spun idly around by the driving bevel gear 33 of the crank spindle 30; whereas, when the clutch band 38 is drawn tight the ring 35 is held stationary and the crank spindle 30 then travels around the ring and constantly rotates the entire motor casing and thus drives the wheel.

The explosive mixture from the carbureter (not shown) mounted on the frame is admitted to the crank chamber through the passage 400, with non-return valve 41. The charge is compressed in the crank chamber by the down stroke of the piston and passes through the passage 42 to the explosion cylinder through port 43 which is opened at the end of the working stroke of the piston. A deflecting barrier 44 is provided at the head of the piston to prevent the direct flow of the explosive mixture through the explosion chamber to the exhaust port 45 opening to the exhaust passage 46, which may be extended around the cylinder casing to afford an expansion chamber from which a group of perforations 47 open. The passage 46 thus serves as a muffler for the exhaust.

The spark plug 48 is connected by wire 49 to high tension current transmitting ring 50 and the low tension ring 51, both on the exterior of the crank casing and to which current is led from battery 52 through suitable windings in the induction coil 53 and brush contacts. An interrupter mechanism 54 is interposed in the line leading to commutator 55 while from the latter the connection is made through a sliding contact 56 cooperating with rotary timer contact 57 at the end of crank shaft 29. The ignition system per se is not novel save in the particular adaption of it to the present engine and for this reason is not explained or claimed in detail. Obviously a magneto system could be employed equally well, the rotary parts being mounted on the crank shaft 29.

A brake band 58 is arranged in channel 59 formed in the casing at the greatest diameter of the crank case. A brake operating rod 60 is carried to the handle bar from the bell-crank lever 61, one end of which is connected to the brake band 58.

In order to relieve the pressure in the explosion chamber 24 on the starting of the engine, I provide a relief valve 62 which may be held open against the action of its spring 63 by a lever 64, pivoted at 65 and operated by a rod 66 leading to the handle bar. To start the engine the relief valve 62 is opened, the clutch strap 38 is tightened and the motor-wheel is manually propelled for a few steps, thus rotating the crank discs 27 and 28 and consequently reciprocating the piston in the explosion cylinder. This effects the admission of charge to the crank case, the compression thereof, the admission of the compressed charge to the cylinder 24 where its explosion sets the engine in operation.

Various modifications in detail, construction and arrangement will readily occur to those skilled in the art which do not depart, however, from what I claim as my invention. While I have described my invention particularly with reference to motor cycles, it will be readily understood that this motor wheel may be utilized in many other associations.

I claim:—

1. A motor wheel having rotary explosion engine operatively associated therewith to drive the same, a gear ring geared to said engine, and friction clutch means for holding said ring against rotation to rotate the engine.

2. A motor wheel having a rotary explosion engine connected thereto, a gear ring geared to the motor, a fixed member associated with said gear ring and a clutch brake device for uniting said associated members to hold the gear ring and thus effect the rotation of the engine.

3. A motor wheel having a rotary explosion engine connected thereto, a fixed bearing cap for the same, a gear ring geared to the engine and a clutch brake for uniting said ring and cap to hold the ring and thus effect the rotation of the engine.

4. A motor wheel having a rotary explosion engine connected thereto and having an explosion cylinder substantially coaxial with the wheel, a shaft driven by said engine, a gear on said shaft, a gear ring meshing therewith and means for holding said ring to effect the rotation of the engine.

5. A motor wheel having a coaxial explosion engine connected thereto, a radial shaft driven by the engine, a gear on said shaft, a gear ring meshing therewith and means for holding said ring to effect the rotation of the engine.

6. A motor wheel having a coaxial explosion engine connected thereto, a radial shaft driven by the engine, a gear on said shaft, a gear ring exterior to the engine casing and meshing with said gear on the shaft and means for holding said ring to effect the rotation of the engine.

7. A motor wheel having a rotary explosion engine operatively associated therewith for driving the same in combination with a casing for said engine and a brake bearing on said motor casing for braking the wheel.

8. A motor wheel having a rotary explosion engine operatively associated therewith for driving the same, in combination with a casing for said engine and a band brake surrounding said motor casing for braking the wheel.

9. A motor wheel having a rotary explosion engine comprising an explosion cylinder, the axis of which lies substantially at right angles to the plane of the wheel, a rotor driven by the engine and lying in a plane parallel to the plane of the wheel, a pinion carried thereby with its axis lying in the axial plane of said rotor, and a gear ring meshing with said pinion, and means for holding said gear ring stationary to rotate the engine when the latter is in operation.

10. A motor wheel having an explosion engine connected thereto, said engine having an explosion cylinder, the axis of which lies substantially at right angles to the plane of the wheel, a fly wheel driven by said motor, a shaft fast with said wheel, a pinion on said shaft, and a normally stationary gear ring meshing with said pinion, substantially as described.

In testimony whereof I have signed my name to this specification, in the presence of two subscribing witnesses.

RICHARD T. NEWTON.

Witnesses:
E. R. IRVINE,
J. W. IDERMAN.